Patented May 16, 1950

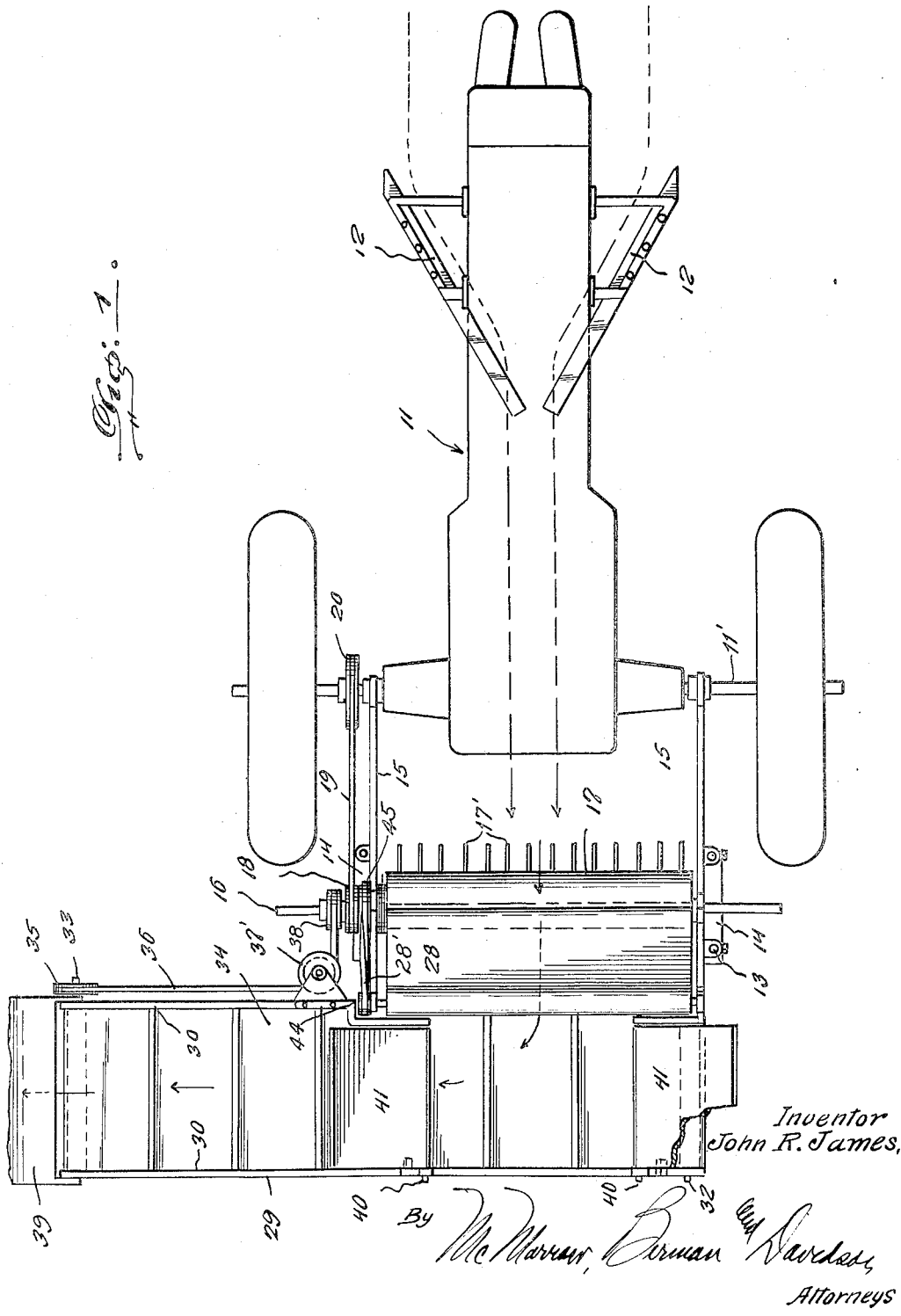

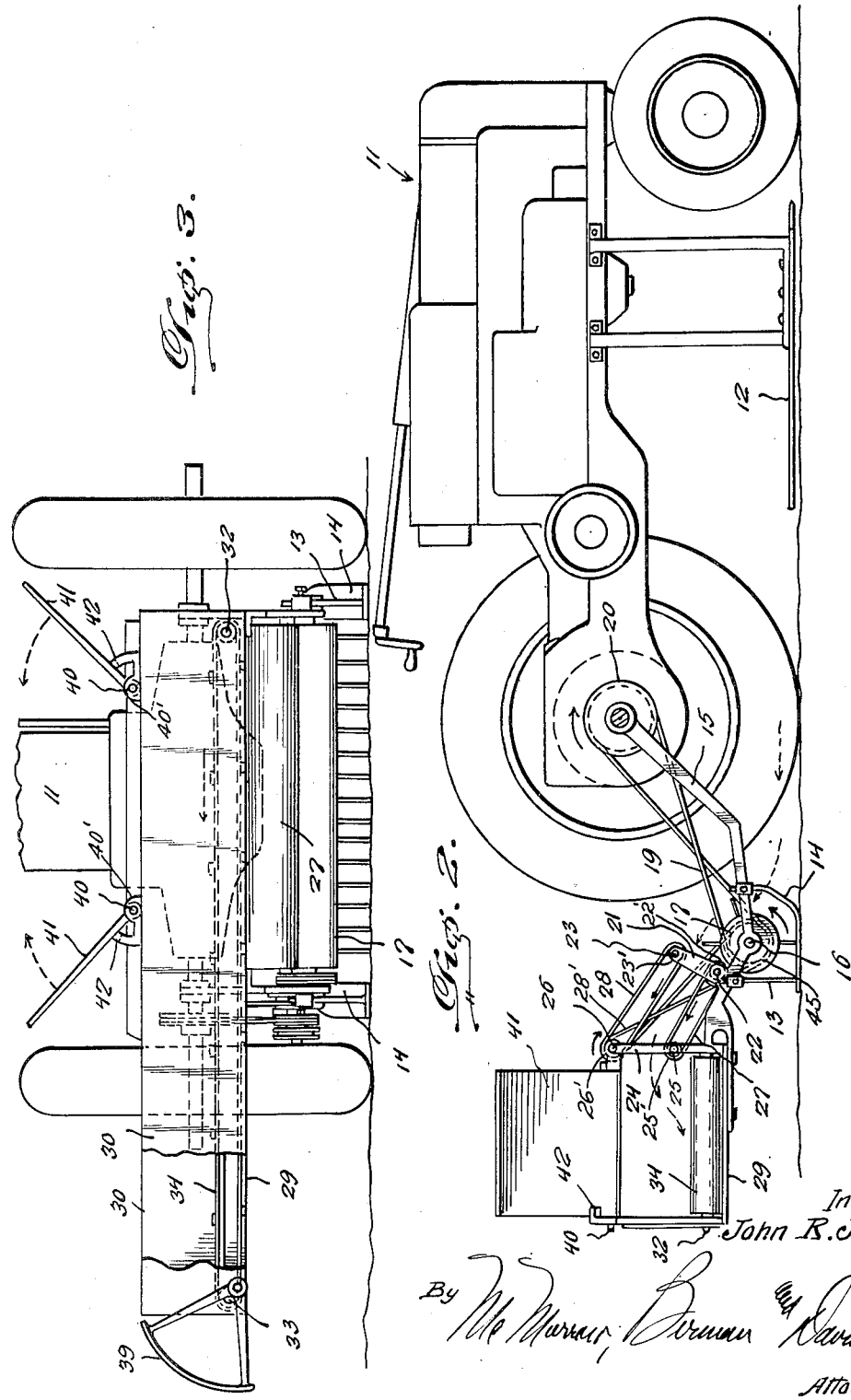

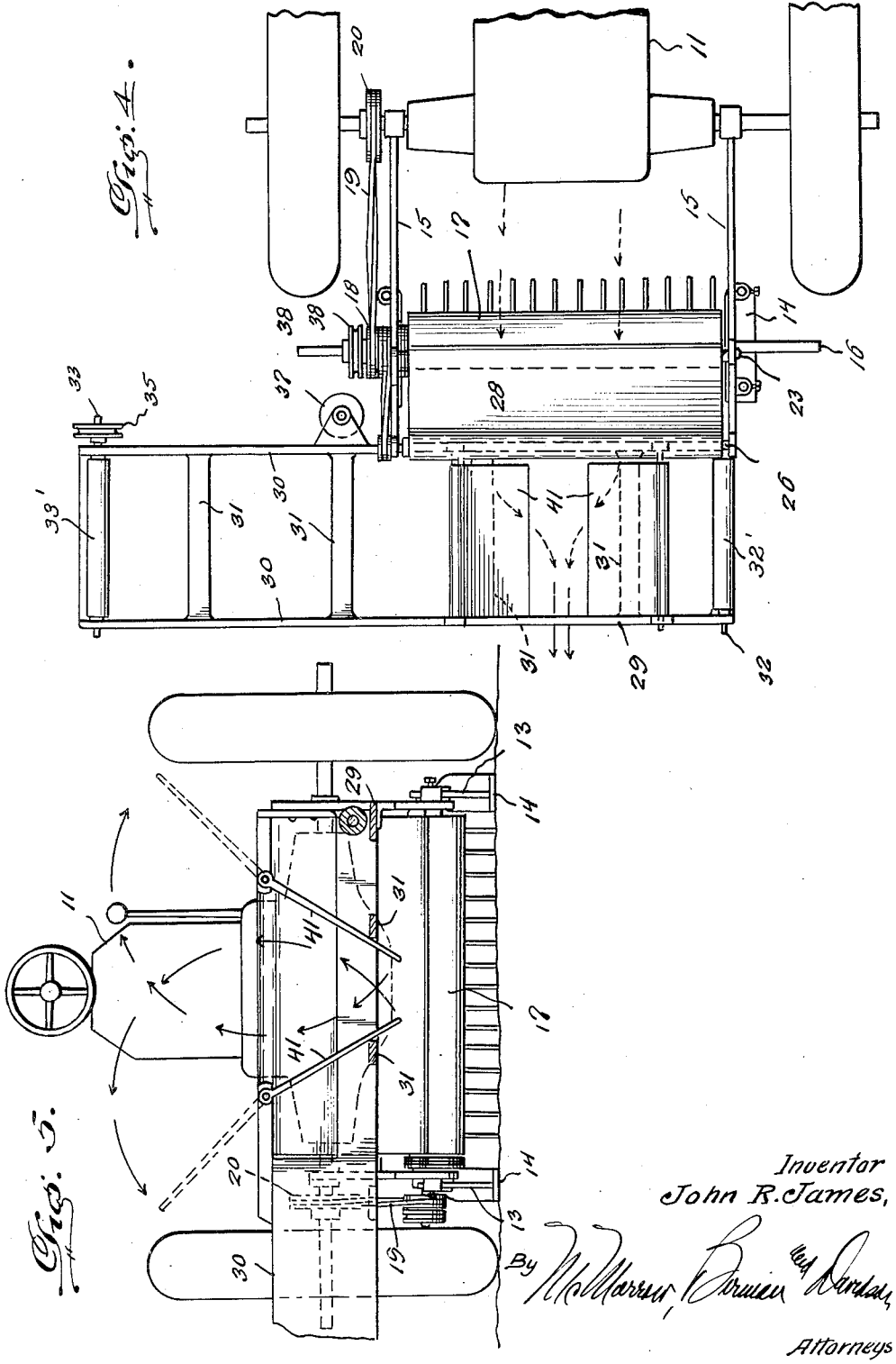

2,507,635

UNITED STATES PATENT OFFICE 2,507,635

BEAN, PEA, AND PEANUT WINDROWER

John R. James, Dolores, Colo.

Application February 12, 1946, Serial No. 647,037

2 Claims. (Cl. 56—27)

This invention relates to improvements in harvesting and windrowing machine for beans, peas, peanuts, and similar crops.

A main object of the invention is to provide a novel and improved harvesting machine for vine crops wherein the crops are detached, elevated from the ground and deposited in windrows, said machine being very simple in structure, easy to operate and efficient in performance.

A further object of the invention is to provide an improved harvesting machine for beans, peas, peanuts, and similar crops wherein the crops are gathered and deposited in a single windrow for a plurality of rows of crops, the machine being tractor-mounted and being driven by power take-off means from the tractor.

Further objects and advantages of the invention will become apparent from the following description and claims, and from the accompanying drawings, wherein:

Figure 1 is a top plan view of a harvesting device in accordance with the present invention, said device being arranged for lateral deposition of the harvested crop material.

Figure 2 is a view in side elevation of the harvesting device of Figure 1.

Figure 3 is a rear end elevational view, partly broken away, of the harvesting device of Figure 1.

Figure 4 is a top plan view of the harvesting device showing the parts thereof arranged for central deposition of the harvested crop material.

Figure 5 is a rear end elevational view, partly in cross section, of the harvesting device arranged as in Figure 4.

Referring to the drawings, the numeral 11 generally designates a tractor of substantially conventional design, having mounted on the forward end thereof a pair of rearwardly convergent cutting knives 12, 12 arranged to detach from the ground and bunch together vine material such as beans, peas, peanuts, and the like, responsive to forward travel of tractor 11 over a row of such material.

Arranged to drag freely on the ground behind the tractor 11, is a skid structure 13 comprising a pair of runner members 14, 14, each runner member being secured to a drawbar 15 whose forward end is pivotally secured to a corresponding rear axle 11' of the tractor. Journalled between the drawbars 15, 15 is a transverse shaft 16 carrying a toothed pick-up drum 17 and has a pulley 18 which is coupled by a crossed belt 19 to a pulley 20 on a rear axle 11' of the tractor.

As shown in Figure 2, toothed pick-up drum 17 rotates counter-clockwise responsive to forward movement of tractor 11, so as to pick up the gathered vine material from the ground. The teeth 17' of the drum are made of spring wire or similar resilient material stiff enough to support the loose vines but yield in response to contact with the adjacent rearward portions of the harvester.

The rearward portions of drawbars 15, 15 are formed with upwardly and forwardly inclined arms 21, 21. Journalled between the arms 21, 21 is a lower conveyor shaft 22 carrying a conveyor drum 22' and an upper conveyor shaft 23 also carrying a conveyor drum 23'. Rearwardly of arms 21, 21 the drawbars 15 are formed with upright arms 24, 24 between which are journalled lower and upper conveyor shafts 25 and 26, also carrying conveyor drums 25' and 26', respectively. A conveyor belt 27 of canvas or similar flexible material is trained over the drums 21' and 25' and a similar belt 28 is trained over the drums 23' and 26'. Belts 27 and 28 are upwardly and rearwardly inclined and are substantially parallel.

The upper belt 28 is driven so that its lower flight moves rearwardly, by a crossed belt 28' trained over a pulley 44 on the shaft 26 and a pulley 45 on the shaft 16. The vine material picked up by the toothed drum 17 is elevated between the parallel rearwardly moving facing flights of elevator belts 27 and 28, whereby the material is carried rearwardly and upwardly until it drops off the upper ends of these belts.

Mounted on rear extensions of the drawbars 15 is a transversely elongated frame 29 extending laterally beyond one side of the tractor 11 for a distance substantially equivalent to the spacing between two adjacent crop rows, measured from the center line of the tractor. Frame 29 comprises front and rear plate-like bars 30, 30 of substantial vertical width, connected by a plurality of spaced cross-bars 31. Journalled between the bars 30, 30 at opposite ends of the frame 29 are conveyor shafts 32 and 33, respectively, carrying drums 32' and 33', respectively, over which is trained a removable conveyor belt 34 of canvas or similar flexible material. The forward end of the shaft 33 has a pulley 35 which is coupled by a drive belt 36, running over an idler pulley 37' on the forward frame member 30, to a drive pulley 38 on shaft 16. The belt 34 is located below the level of the upper rearward end of the lower elevator belt 27, so that the harvested vine material propelled rearwardly by the elevator belts 27 and 28 is deposited upon the transverse conveyor belt 34 and is carried laterally outwardly and deposited thereby upon the ground at the laterally outward end of the frame 29 in a row parallel to and spaced from the path of travel of the tractor 11 at a distance equal to the distance between crop rows. An arcuately curved guard member 29 is mounted on the laterally outward end of the frame 29 adjacent to the shaft 33 to guide the vine material on the conveyor belt 34 downwardly in a compact mass for deposit on the ground. The frame bars 30, 30 rise to sufficient heights along the opposite sides of the conveyor belt 34 to guide and compact the material thereon as it is carried toward the laterally outward end of the frame 29.

Pivotally mounted on horizontal shafts 40, 40 journalled on suitable brackets 40', 40' on the upper edges of the frame members 30, 30 and extending therebetween at points within the side edges of the upper elevator belt 28 is a pair of baffle plates 41, 41. When the harvesting device is arranged for lateral deposition, as in Figures 1, 2 and 3, the baffles 41, 41 are swung upwardly and outwardly into inoperative positions and rest on stop lug members 42, 42 on the brackets 40'. When the harvesting device is to be employed for center deposition of harvested material, belt 34 is removed and the baffles 41, 41 are swung downwardly and inwardly to mutually convergent positions shown in Figures 4 and 5, wherein they are supported by cross members 31, 31 secured to and between the lower part of the members 30, 30, so that the harvested material deposited by the elevator belts 27 and 28 drops onto the baffles 41, 41 and is thereby deposited on the ground in a compact row along the center line of the path of travel of tractor 11.

In harvesting a field of vine material such as beans, peas, or the like, the device is first arranged for center line deposition of harvested material and alternate rows are harvested. The device is then arranged for lateral deposition of harvested material and the remaining rows are harvested. During the second stage of harvesting the laterally deposited material is placed in rows coinciding with the harvested rows of the first stage, so that only half as many windrows are produced as would otherwise result from harvesting. This, of course, greatly reduces the time and labor required in subsequent operations on the harvested material.

Another procedure which may be followed is to harvest a row with the device arranged for center line deposition and then arrange the device for lateral deposition and harvest the rows on either side of the original row, so as to place the harvested material in the original row. Other procedures may, of course, be employed.

While a specific embodiment of the invention has been disclosed herein, it will be understood that various modifications within the spirit of the invention may occur to those skilled in the art. Therefore it is intended that no limitations be placed on the invention other than as defined by the scope of the appended claims.

What is claimed is:

1. Windrowing apparatus comprising ground engaging means supporting said apparatus for movement over the ground, a pair of drawbars connected to and extending forwardly from said ground engaging means, a pick up drum mounted on and between said drawbars in the region of said ground engaging means, extensions on said drawbars projecting rearwardly beyond said pick up drum, a transversely elongated frame mounted on said extensions, means on said frame for depositing picked up material on the ground in a defined row as the apparatus is moved forwardly, elevating means mounted on said frame and said extensions for elevating material picked up by said pick up drum and discharging the material onto said depositing means, means for turning said pick-up drum as said apparatus moves forwardly, and means operatively connecting said pick up drum and said elevating means, said depositing means comprising a pair of depending inwardly converging baffle plates onto which said elevating means discharges.

2. In windrowing apparatus of the type involving means for picking up from the ground the material to be windrowed, an open frame behind said pick-up means, and baffle plates on said frame on opposite sides of said pick-up means onto which said pick-up means discharges the picked up material, said baffle plates converging downwardly and laterally inwardly toward each other whereby the material deposited thereon falls downwardly therebetween and is thereby compacted to fall from between the lower ends of said baffle plates onto the ground.

JOHN R. JAMES.

REFERENCES CITED

The following references are of record in the file of this patent:

UNITED STATES PATENTS

| Number | Name | Date |
| --- | --- | --- |
| 412,294 | Renard | Oct. 8, 1889 |
| 678,543 | Conner | July 16, 1901 |
| 1,142,927 | Beck | June 15, 1915 |
| 1,792,691 | Harris | Feb. 17, 1931 |
| 2,338,932 | Grant | Jan. 11, 1944 |
| 2,369,850 | Powers | Feb. 20, 1945 |
| 2,429,371 | Romanik | Oct. 21, 1947 |